INVENTOR.
David MacGregor
BY Strauch & Hoffman
Attorneys

Patented Jan. 12, 1954

2,665,877

UNITED STATES PATENT OFFICE 2,665,877

PRESSURE SEALED VALVE

David MacGregor, Munster, Ind., assignor to Edward Valves Incorporated, East Chicago, Ind., a corporation of Indiana Application May 7, 1947, Serial No. 746,582

4 Claims. (Cl. 251—128)

This invention relates to fluid control valves, and in particular to check valves for the control of the flow of a high temperature, high pressure fluid such as steam or the like.

Valves of this general type comprise a hollow body through which the fluid flows in one direction causing the check disc to become unseated by the pressure of the flowing fluid when flowing in the intended direction and to automatically become seated to prevent the flow of fluid in the opposite other direction, the force with which the valve becomes seated to stop the reverse flow being dependent largely upon the pressure of the fluid on the discharge side of the valve body. The body is provided with an opening through which the valve disc can be inserted into the body and positioned for movement with respect to the valve seat. Since valves of this type do not require any external control means, the opening through which the valve disc is inserted is closed by a closure which is normally removed only for the purpose of inspection and repair.

Where valves of this type are used in the control of the flow of large volumes of rapidly moving fluid, it is desired to reduce the friction losses through the valve to as low a value as possible, and for this reason the valve seat is arranged to provide a comparatively unrestricted flow of fluid through a smooth internally contoured body when the disc is raised from the seat. When a valve seat is thus arranged a correspondingly sized valve disc must be used, and the opening in the valve body through which the disc is inserted is therefore of corresponding size. In view of the large size of the opening for inserting the disc, a large closure device is required for this opening. This requirement leads to complications because the closing device must include a seal which will positively prevent leakage through the opening and at the same time be easily removed for the purpose of inspection and repair. Various forms of closing devices have been used in the past with some success, including types wherein the internal pressure of the fluid within the valve body is used to assist in squeezing the closure device seal so that in effect the sealing pressure is increased in accordance with the increase in internal pressure within the valve body.

I have invented a combined closure and sealing device of the latter type which is of simplified construction, while at the same time providing an improved closure and seal which may be easily disassembled for inspection of the valve or removal of the parts thereof, and which may be as easily reassembled to provide a positive closure and seal. In valves of this type, it frequently occurs that the valve disc is raised with considerable velocity when a high rate or volume of flow of fluid is admitted to the valve body for passage therethrough. Although it is customary to provide damping means to slow this movement, there is still considerable shock when the moving valve disc reaches the upper end of its stroke, which is determined by the position of a mechanical stop of some form. In the valve of my invention, the stop for the moving valve disc is the closure and pressure sealing device which is consequently subjected to a considerable shock by reason of being struck by the moving valve disc or parts associated with it. However, the improved and novel combined closure and sealing device of my invention is fully designed to withstand the aforesaid shocks as well as to close and seal the opening in the valve body.

It is accordingly the major object of my invention to provide a novel and improved check valve and closure and sealing means therefor.

It is another major object of my invention to provide a new and improved closure and sealing means for an opening in a body or vessel which is subjected to high internal pressures.

Another object of my invention is the provision of a new and improved closure and seal for the opening in a check valve body through which the valve is inserted and wherein the closure and seal are subjected to high internal fluid pressures as well as to the shock of stopping the moving check valve during an opening movement thereof.

It is another object of my invention to provide a novel and improved closure for an opening in a pressure vessel, wherein a segmented locking ring is inserted to fit within the walls of the opening to provide a stop to hold the closure and seal within the opening.

Other objects will become apparent as the description proceeds in connection with the attached drawings, wherein.

Figure 1:
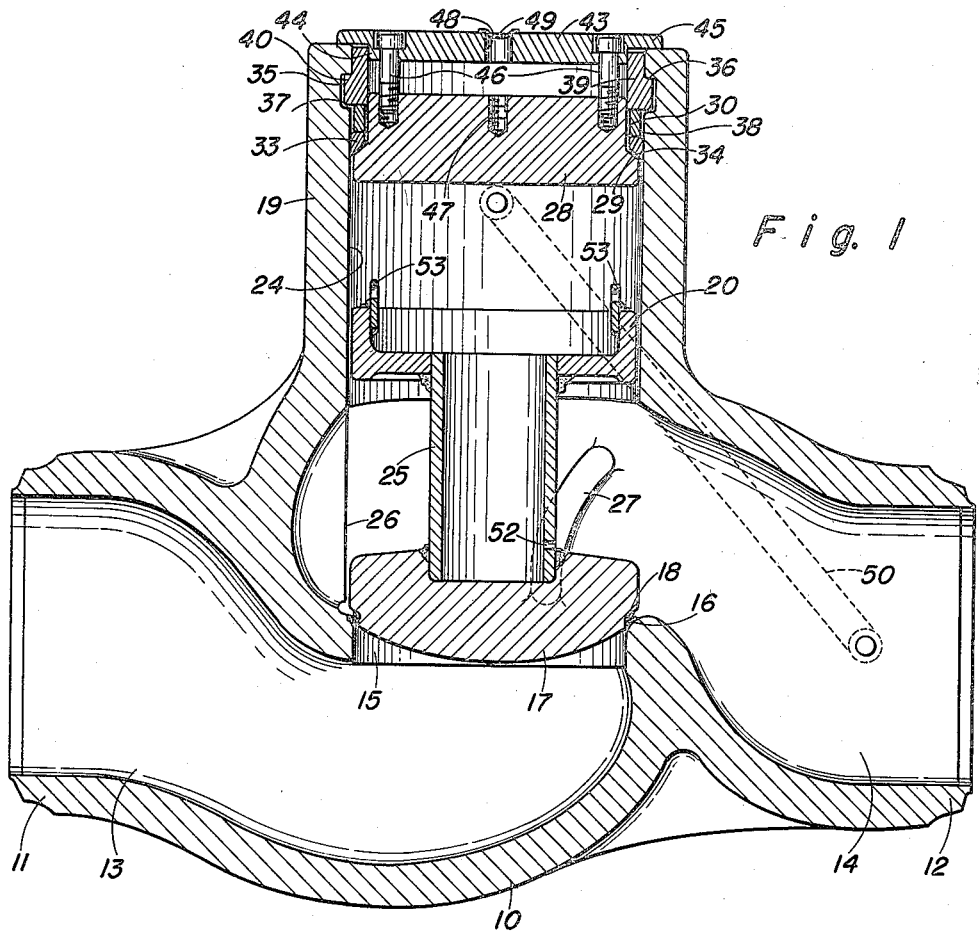
Figure 1 is a longitudinal vertical sectional view through a check valve embodying my invention.

The valve body 10 of Figure 1 is of the globe type having an inlet 11 coaxial with its outlet 12. While a globe type valve body is shown, it is to be understood that the invention applies equally to an angle type wherein the inlet 11 comes into the bottom of the body 10 and is at a 90 degree angle to the outlet 12. Between the inlet passageway 13 and the outlet passageway 14 is disposed a horizontal circular opening 15, the top edge portion of which forms a valve seat 16. A disk 17, when in its lowermost position as shown in Figure 1, engages the valve seat 16 around its entire periphery and closes the opening 15. Preferably, the valve seat 16 is formed by a welded layer of "Stellite," a hard stainless chromium tungsten cobalt alloy, and the portion 18 of the disk 17, which engages the valve seat, is similarly formed of "Stellite." The engaging surfaces of the seat 16 and the portion 18 are machined for full mating engagement to close the passageway or opening 15 when the disk 17 is in its lowermost position.

The valve body 10 has a vertically extending hollow boss 19 which is coaxial with the opening 15 and of such internal diameter that the disk 17 may be inserted therethrough to its normal position. A piston 20 has a sliding fit within the bore 24 of the hollow boss 19, and is rigidly connected to the disk 17 by a hollow cylindrical member 25 which is welded to both the piston and to the disk. While the angle between the boss 19 and the outlet 12 is shown to be a right angle it is to be understood that this angle may be less or more than 90 degrees.

In the space within the body above the opening 15 are provided three guide vanes, two of which only are shown in the drawings and identified by the reference numbers 26 and 27. The vanes 26 and 27 are spaced at an angle of substantially 120 degrees, and the third vane, which is not shown, is also spaced at an angle of 120 degrees from the vanes 26 and 27 and is curved toward the outlet passageway 14 in the same manner as is the curved guide vane 27. The aforesaid three guide vanes extend inwardly so that they engage the periphery of the valve disk 17 at three substantially equally spaced intervals to guide it during its vertical movements so that it is assured that the portion 18 of the disk will engage the seat 16 when the disk is at its lowermost position. The piston 20 sliding within the bore 24, also assures that the disk 17 will move axially with respect to the opening 15. The two curved vanes, one of which is shown at 27, aid in reducing the friction losses due to the passage of the fluid through the valve body by directing the fluid towards the outlet passageway 14 as it passes through the opening 15 as disclosed in my co-pending application Serial Number 662,340 filed April 15, 1946, now Patent No. 2,621,016. The guide vane 26 is not curved but is substantially vertical.

Figure 2:
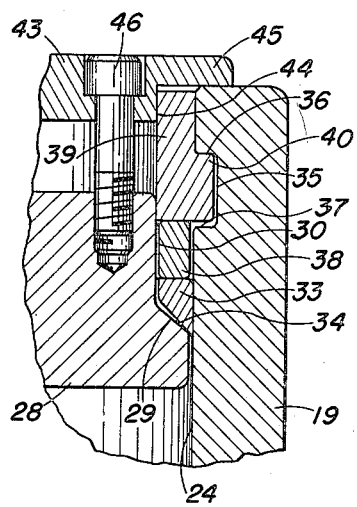
Figure 2 is an enlarged view of a portion of Figure 1 showing the sealing gasket and locking ring, etc.

As shown in Figures 1 and 2, a pressure plug 28 is fitted relatively loosely within the bore 24 in the hollow boss 19. The plug 28 has its largest diameter at its bottom portion, the diameter being reduced at a tapered shoulder 29 and terminating in a cylindrical portion 30 of substantially smaller diameter than the bore 24. A gasket 33 surrounds the plug 28 in the region of the tapered shoulder 29. As best shown in the enlarged view of Figure 2, the gasket 33 is tapered downwardly and outwardly at its bottom portion to form an inclined bottom surface 34. The angle that is made by the inclined bottom surface 34 with the bore 24 is more acute than the angle between the tapered shoulder 29 at the bore 24, and the outer diameter of the gasket 33 may be slightly larger than the largest diameter of the plug 28, although having a sliding fit within the bore. This is in accordance with the disclosure in my co-pending application Serial Number 662,341 filed April 15, 1946 wherein the exact angles of the inclined gasket and shoulder 29 are disclosed.

Figure 3:
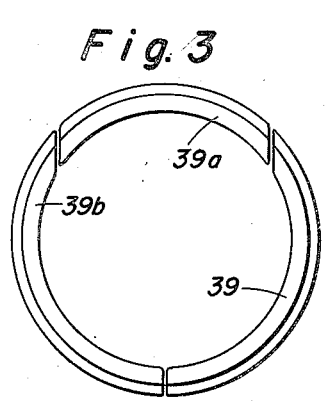
Figure 3 is a top plan view of the three-part segmented locking ring.

The bore 24, adjacent to but spaced below the top of the boss 19, has an annular recess 35 which provides an upper shoulder 36 and a lower shoulder 37. Surrounding the reduced cylindrical portion 30 of the plug 28 is an annular spacer ring 38 which has its lower edge against the top of the gasket 33 and its upper edge substantially in the same plane as the aforesaid lower shoulder 37. The pressure plug 28 is retained against outward movement within the hollow boss 19 by means of a locking ring 39 which has an external flange 40 seated within the annular recess 35. As shown in Figure 3, the locking ring has three segments 39, 39a, and 39b. In order to insert the locking ring segments, the pressure plug 28 is lowered slightly below the position shown in Figure 1, and the three segments are located by putting their external flanges 40 within the annular recess 35. When inserting the locking ring segments, the segments 39 and 39b are inserted first, and then the segment 39a is inserted, the reason for this being apparent from an inspection of Figure 3. The pressure plug 28 may now be raised to the position shown in Figure 1 so that the three segments of the locking ring are retained within the recess 35 by reason of the fact that the reduced cylindrical portion 30 of the plug 28 fits within them and retains them against any inward movement, which movement would displace them from the annular recess 35.

A circular retainer plate 43 has a reduced portion 44 which fits within the segments at their upper ends. The plate 43 also has an enlarged portion 45 which overlies the upper end of the hollow boss 19, and rests upon it. A series of equiangularly spaced cap screws 46 pass through the retainer plate 43 and have threaded engagement in the top of the pressure plug 28. As shown in Figure 1, the cap screws 46 have their heads received in countersunk bores within the retainer plate, their heads being engageable by a suitable tool. It is to be understood that the heads need not be recessed into the plate, and that studs and nuts or any other suitable means of securing the plate 43 to the plug 28 may be used. As also shown in Figure 1, the pressure plug 28 has a tapped hole 47 in vertical alignment with a central bore 48 in the retainer plate 43. The aligned hole 47 and the central bore 48 are used during assembly of the closure and pressure seal into the top of the boss 19.

During assembly, after the disk 17 with its piston 20 are dropped into the bore 24, the pressure plug 28 is inserted into the bore. Due to its loose fit therein, the plug 28 will normally drop to the bottom of the bore 24, but a rod (not shown) is threaded into the hole 47 and extends upwardly out of the boss to provide means for holding the pressure plug 28 in its normal raised position, while the gasket 33, the spacer ring 38, the locking ring 39, and the retainer plate 43 are placed in their proper relative positions. The last of these elements that is put in place is the retainer plate 43 and the aforesaid holding rod will pass vertically through the bore 48 therein. The cap screws 46 may then be inserted through the retainer plate and threaded into the pressure plug 28 to hold it in place. The aforesaid holding rod may then be removed, since it has no further use, and the bore 48 may be closed by a removable dust cap 49.

As previously described, the gasket 33 is preferably of slightly larger outside diameter than the pressure plug 28 at its largest diameter. The gasket may be of a relatively soft iron having a maximum hardness of approximately 90 Brinell. Other materials, such as asbestos, may be used instead of soft iron, the material used being dependent upon the various factors such as the use to which the valve is to be put. Since the locking ring 39 prevents upward movement of the spacer ring 38 and of the gasket 33, it will be apparent that when the pressure plug 28 is forced upwardly, it will pinch the lower and outer pointed end of the gasket between itself and the bore 24 of the boss 19. This provides a very effective seal which becomes more tightly compressed by the upward force on the pressure plug resulting from internal pressure within the valve body 10 as disclosed in my aforesaid co-pending application Serial Number 662,341.

After the complete closure and pressure seal is assembled into the top of the boss 19 as previously described, the cap screws 46 are turned so as to draw the pressure plug 28 upwardly and compress the gasket 33 slightly at its pointed end so as to apply an initial sealing pressure to the assembly. The cap screws 46 should be carefully adjusted to assure that this sealing pressure is applied substantially equally to the gasket around its entire circumference. When the valve is installed and subjected to internal pressure, the upward force resulting from this pressure will squeeze the gasket and deform it to a greater extent than was accomplished by the initial tightening of the cap screws 46. It may then be found, while the internal pressure still exists within the valve body, that the pressure plug 28 has been raised by a slight amount so that the cap screws 46 may be easily rotated. At this time, they should be again tightened so as to retain the pressure plug 28 in the same position after the internal pressure has been released.

It is thus seen that the closure and pressure seal provided by my construction needs no external rings or clamps to take the load caused by internal pressure. The internal pressure is sealed off between the pressure plug and the gasket, and the load caused by the pressure is held by the segmented locking ring 39 which is positively centered by the guiding areas of the retainer plate and the pressure plug. In addition to the other advantages resulting from the aforesaid construction, the entire closure and pressure seal are easily removed merely by removing the cap screws 46 whereupon the retainer plate 43, the locking ring 39, and the entire pressure plug and gasket assembly can be removed. The same threaded rod used during initial assembly may be threaded into the tapped hole 47 in the pressure plug 28 to assist in pulling the elements out of the bore 24.

As previously mentioned, the piston 20 within the bore 24 serves as a dashpot to dampen the opening movement of the disk 17 when the fluid pressure is first admitted to the inlet passageway 13. However, means are provided to vent the compressed fluid from the confined space above the piston 20 in order to allow the disc 17 to reach the top of its stroke in order to provide a full opening through the opening 15. An external pipe 50 is provided and is connected to the bore 24 just below the pressure plug 28, and is also connected to the outlet passageway 14 and serves to equalize the pressure between these two points so that, as the piston 20 rises within the bore 24, the trapped fluid will pass through the pipe 50 and into the outlet passageway 14. In a similar manner, when flow through the valve body in the normal direction is stopped so that the pressure of the flowing fluid does not maintain the disk 17 in its raised position, the assembly formed by the disk 17, the piston 20, and the member 25, will fall by its own weight to close the opening 15 against the flow of fluid in the reverse direction. The pipe 50 allows fluid to enter the space above the piston 20 to avoid the formation of a vacuum which would retard the dropping of the assembly to close the opening 15. Adjacent its bottom, the hollow member 25 connecting the disk 17 and the piston 20 is provided with an opening 52 which will allow liquids, such as condensed steam or the like to drain out of the member 25, and from the space above the piston 20 and within the bore 24.

I have also shown in Figure 1, that if the piston 20 were allowed to travel upwardly until it engages the pressure plug 28, its skirt would seal off the opening to the equalizer pipe 50. In order to prevent this, a number of upwardly extending stops 53 are secured, as by welding, to the top of the piston so that they will engage the underside of the pressure plug 28 to limit the upward movement of the piston so that it will not close the opening to the pipe 50.

A considerable shock is sometimes applied to the pressure plug 28 when the piston and disk assembly is quickly opened, due to the supply of high pressure fluid to the inlet passageway 13. My novel and improved closure and pressure seal construction not only effectively closes the upper end of the bore 24 in such a manner that the seal is clamped more effectively as the internal pressure increases, but it is of such construction and strength that it also withstands the shock of the opening movement of the valve disk 17 and the piston 20. While I have illustrated my novel and improved closure and pressure seal in connection with a check valve it is to be understood that it may also be used where a valve stem protrudes through the boss 19, the stem having a packing between itself and the pressure plug as disclosed in my aforesaid co-pending application Serial Number 662,341 and the closure and seal is effective and adaptable in other devices wherein a positive pressure seal and closure is needed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a hollow body adapted to be subjected to internal pressure, and having a bore with a cylindrical surface to provide an access opening; an annular recess in the wall of said bore adjacent to but spaced from the top thereof; a removable segmented locking ring in said recess and forming an annular shoulder in said bore; a movable closure member having an integral reduced portion telescoped within said locking ring and an enlarged flange spaced from said locking ring; a gasket between said locking ring and said enlarged flange against which said closure member is forced by internal pressure; a retaining member having an integral reduced portion telescoping within said locking ring to retain it in said recess and an enlarged portion overlying the body surrounding said bore; and a plurality of spaced devices between said closure member and said retaining member operative to apply initial sealing compression on said gasket.

2. In a structure having a hollow body adapted to be subjected to internal pressure, and having a tubular portion with a circular bore open at its outer end; an annular recess in the wall of said bore adjacent its outer end; a removable segmented locking ring seated in said recess and forming an annular shoulder in said bore; a closure for said bore having a reduced portion fitting within said locking ring to retain it in said recess and an enlarged flange spaced from and below said locking ring; a gasket between said flange and said locking ring, said gasket having an inclined surface facing said flange and making an acute angle with said bore; said flange having an inclined surface facing said gasket to squeeze said gasket outwardly against the surface of said bore, and making a larger acute angle with said bore than the angle made by said inclined gasket surface; a retainer plate overlying the end of said tubular portion, a reduced portion on said retainer plate fitting within said locking ring to retain said locking ring in said recess, and connecting means between said retainer plate and closure operable to move said closure toward said locking ring.

3. In a check valve, a body having an inlet passage and an outlet passage and a valve seat therebetween; a free floating valve disk adapted to be urged away from said seat by fluid flowing through said valve from said inlet passage toward said outlet passage, said body being constructed to direct incoming fluid against the lower surface of said disk in all positions thereof; a guide piston connected to said valve disk; means forming a bore having a substantially cylindrical portion in said body above and coaxial with said seat for slidably receiving said guide piston during movement of said disk toward and away from said valve seat; an annular recess in the wall of said bore adjacent its outer end; a removable segmented locking ring seated in said recess and forming an annular downwardly facing shoulder in said bore; a closure member having a reduced portion fitting within said locking ring to retain it in said recess and an enlarged flange spaced from and below said locking ring and slidably mounted in said cylindrical portion of said bore, said closure member forming with said guide piston a substantially closed chamber in said bore; a gasket between said flange and said locking ring, said gasket and said flange having opposed surfaces each making an acute angle with said bore; a gasket overlying the outer end of said bore; connecting means between said retainer and said closure member operable to move said closure member toward said closure retainer to compress and force said gasket outwardly against said bore with an initial sealing pressure; cooperating abutment means on said piston and said closure member for limiting upward movement of said piston, said abutment means being operative to maintain said lower surface of said disk in the path of said incoming fluid in the full open position of said disk whereby the incoming fluid pressure exerts a sustained force on said disk which is transmitted through said abutment means to said closure member to further urge said closure member upwardly to thereby augment said initial sealing pressure; and a pressure equalizing conduit independent of said outlet passage connecting said chamber with the outlet passage in all positions of said disk to vent said chamber, assist in moving said disk to its full open sealing pressure augmenting position and stabilize the valve element in its full open position.

4. In a valve, a hollow body having an inlet passage and an outlet passage and an internal valve seat therebetween; a valve element including a disk adapted to be urged away from said seat by fluid flowing through said valve from said inlet passage toward said outlet passage and a guide piston rigid with said disk, said body being constructed to direct incoming fluid against the lower surface of said disk in all positions thereof; means forming a bore having a substantially cylindrical portion in said body above and coaxial with said seat for slidably receiving the guide piston during movement of said disk toward and away from said valve seat; means forming an annular downwardly facing shoulder within said bore; a closure member having an enlarged portion below said shoulder, slidably mounted in said substantially cylindrical portion of said bore and forming with said guide piston a substantially closed chamber in said bore; an annular sealing gasket between said shoulder and said enlarged portion; closure tightening means for urging said closure member towards said shoulder to compress and force said gasket outwardly against said bore with an initial sealing pressure; cooperating abutment means on said valve element and said closure member for limiting upward movement of valve element, said abutment means being operative to maintain said lower surface of said disk in the path of said incoming fluid in the full open position of said valve element whereby the incoming fluid exerts a sustained force on said disk which is transmitted through said abutment means to said closure member to further urge said closure member upwardly to thereby augment said initial sealing pressure; and a pressure equalizing conduit independent of said outlet passage connecting said chamber with the outlet passage in all positions of said valve element to vent said chamber, assist in moving said valve element to its full open sealing pressure augmenting position and stabilize the valve element in its full open position.

DAVID MacGREGOR.

References Cited in the file of this patent

UNITED STATES PATENTS

| Number | Name | Date |
|---|---|---|
| 553,390 | Burns | Jan. 21, 1896 |
| 1,779,322 | Leidecker | Oct. 21, 1930 |
| 2,223,699 | Norgren | Dec. 3, 1940 |
| 2,252,488 | Bierend | Aug. 12, 1941 |
| 2,321,597 | Hobbs | June 15, 1943 |
| 2,332,406 | Smith | Oct. 19, 1943 |
| 2,440,027 | Stoyke | Apr. 20, 1948 |
| 2,443,187 | Hobbs | June 15, 1948 |

FOREIGN PATENTS

| Number | Country | Date |
|---|---|---|
| 6,391 | Great Britain | of 1948 |
| 424,431 | Germany | of 1926 |